Patented June 29, 1937

2,085,690

UNITED STATES PATENT OFFICE 2,085,690

MOLDING MACHINE

Frank R. Wallace, Philadelphia, Pa., assignor to Tabor Manufacturing Company, Philadelphia, Pa., a corporation of Pennsylvania Application November 19, 1934, Serial No. 753,655
Renewed February 23, 1937

4 Claims. (Cl. 22—47)

The present invention relates to improvements in molding machines of the type usually designated jarring, squeezing, trunnion roll, and pattern drawing.

The principal object of the present invention is to provide a machine of the type mentioned which does not require a pit for its installation and which presents its trunnion plate and other parts at a height above the floor convenient for the workmen or attendants.

Other objects of the invention will appear from the following description at the end of which the invention will be claimed.

Generally stated, the invention consists in a frame provided with a pattern drawing cylinder terminating above the floor line of the frame and with at least two posts rigidly supported at the top and bottom ends by the frame, the posts and cylinder being held by the frame in vertical parallelism in association with a cross-head having a mold carrying table and provided with a piston and with sleeves slidable on the intermediate portions of the posts and in combined overall length exceeding the diameter of the piston and ensuring rectilinear motion of the table.

The invention also comprises the improvements to be presently described and finally claimed.

Figure 1:
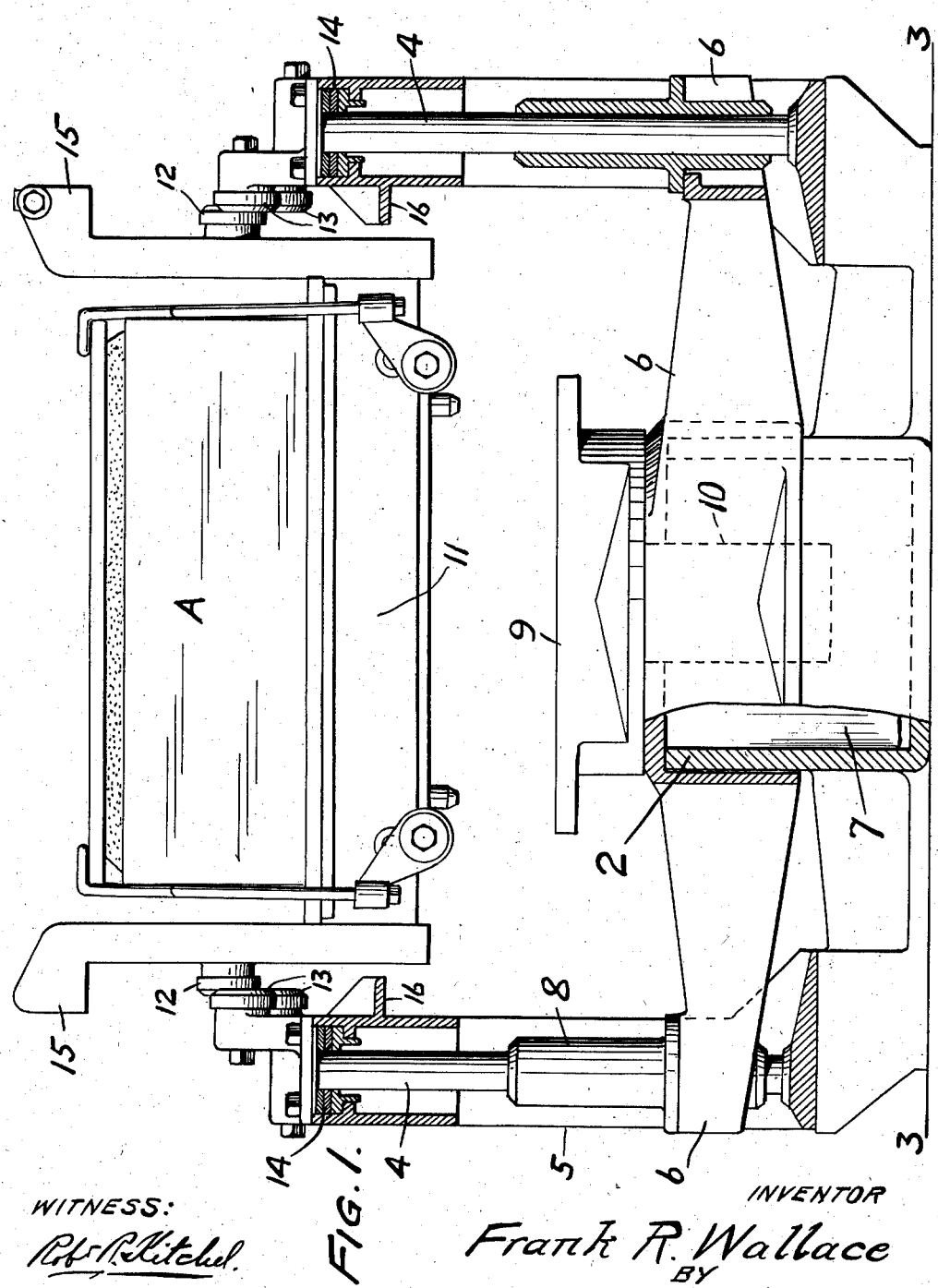
Figure 2:
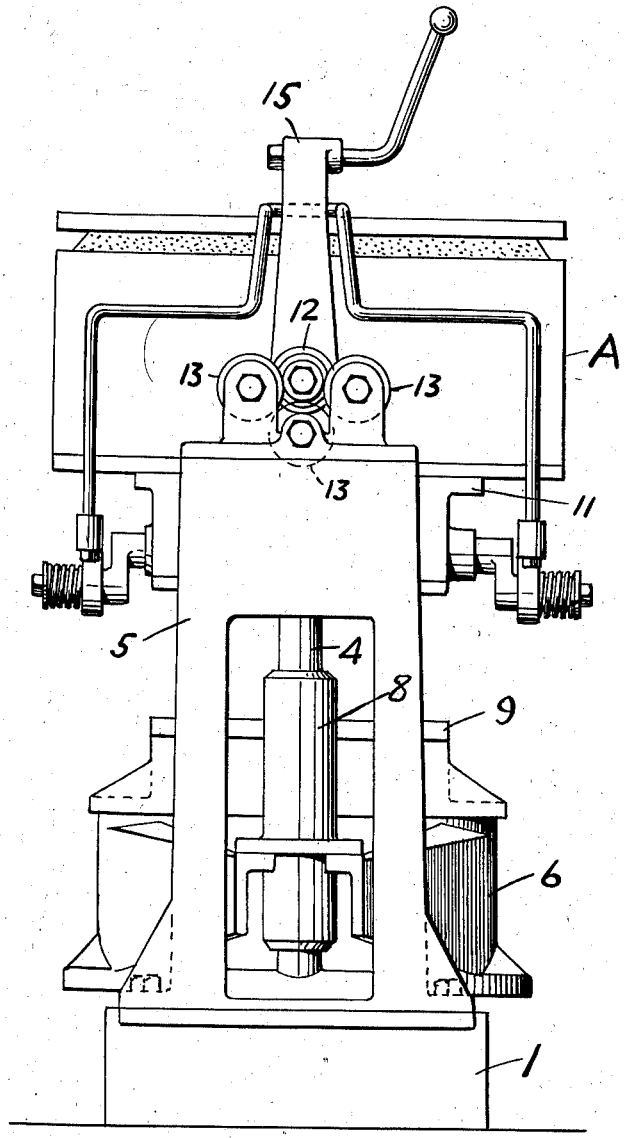

In the following description reference will be made to the accompanying drawings forming part hereof and in which, Figure 1 is a side elevation partly in section of a molding machine embodying features of the invention and illustrating only such parts of the machine as are necessary for an understanding of the invention, and Figure 2 is an end view of the same.

Referring to the drawings, 1 indicates the frame of the machine and it is provided with a pattern drawing cylinder 2 terminating above the base line of the frame or otherwise expressed above the floor line 3 so that in the installation of the machine a pit is unnecesary. It may be remarked that to secure rectilinear motion of a piston in molding machine practice it is necessary that the length of the cylinder should exceed the diameter of the piston by perhaps three times more or less. However, the cylinder 2 is very much more shallow or shorter than such practice would require and this permits the successful operation of the machine without a pit and for reasons that will be explained. The frame 1 is provided with at least two posts and they are rigidly supported at the top and bottom ends by the frame. More accurately the tops of the posts are supported by columns 5 rising from the frame. The posts 4 and cylinder 2 are thus held by the frame in axial parallelism. 6 is a cross-head and it is connected with the piston 7 which operates in the cylinder 2. As shown the cross-head is in the form of a yoke which surrounds the cylinder 2 but is not connected to it. The cross-head is provided with and rigidly connected with sleeves 8 slidable on the intermediate portions of the post. The combined overall length of the cylinder and sleeves, or in other words, the distance from the bottom of the cylinder 2 to the top of the sleeves 8 exceeds the diameter of the piston 7 sufficiently to conform to modern construction practice and to ensure rectilinear reciprocation of the piston 7 so that the sleeves, in cooperation with the cylinder 2, provide the proper length of guiding surface, although the cylinder is so short or shallow that it occupies a position above the floor level. The table 9 which receives the flask is shown as mounted on the jarring piston 10 indicated in dotted lines. As usual the jarring piston is provided within the piston 7 and there is nothing new about this construction. The trunnion frame 11 is provided with rollers 12 mounted upon rollers 13 in such a way that the pattern frame can be lifted from the rollers 13 for jar ramming which is well understood. During jar ramming the sleeves 8 are held against the cushions 14 by the introduction of a proper fluid under the piston 7 and in the cylinder 2; thus the shock of the jar ramming is referred to that fluid. For squeezing, the frame 11 is turned over and the hooks 15 take under the abutments 16 on the columns 5. For pattern drawing the flask A is deposited on the table 9 properly uncoupled and the table 9 is lowered, drawing the mold and sand away from the pattern which is secured to the frame 11.

It will be obvious to those skilled in the art to which the invention relates that modifications may be made in details of construction and arrangement without departing from the spirit of the invention, which is not limited as to such matters or otherwise than the prior art and the appended claims may require.

I claim:

1. In a molding machine, the combination of a frame provided with a pattern drawing cylinder confined and terminating above the floor line of the frame and with at least two posts rigidly supported at their top and bottom ends by the frame, said posts and cylinder being held by the frame in axial parallelism, with a cross-head provided with a piston and with sleeves slidable on the intermediate portions of the posts and in combined overall length exceeding the diameter of the piston and ensuring rectilinear reciprocation of the piston and cross-head, said cross-head provided with a mold carrying table.

2. In a molding machine, the combination of a frame provided with a pattern drawing cylinder terminating and confined above the floor line of the frame and with two columns, posts rigidly supported at their top and bottom ends by the columns and frame, said posts and cylinder being held in axial parallelism, a cross-head provided with a piston and with sleeves slidable on the intermediate portions of the posts and in combined overall length exceeding the diameter of the piston and ensuring rectilinear reciprocation of the piston and cross-head, said cross-head provided with a mold table.

3. In a molding machine, the combination of a frame provided with a pattern drawing cylinder terminating and confined above the floor line of the frame and with two columns, posts rigidly supported at their top and bottom ends by the columns and frame, a cross-head provided with a drawing piston and with sleeves slidable on the intermediate portions of the posts, cushions at the top of the columns and in line with the cross head, a jarring table, and a jarring piston and cylinder interposed between the table and the drawing piston.

4. In a molding machine, a pattern drawing table, a frame provided with a comparatively short cylinder and with columns, posts held at their top and bottom ends by the frame and columns, and an interconnected short drawing piston and cross-head having sleeves slidable on the intermediate portions of the posts, said piston and sleeves providing a comparatively long guiding surface for the table.

FRANK R. WALLACE.